US009657736B2

United States Patent
Fujioka et al.

(10) Patent No.: US 9,657,736 B2
(45) Date of Patent: May 23, 2017

(54) SCROLL FLUID MACHINE

(71) Applicant: ANEST IWATA CORPORATION, Yokohama-shi, Kanagawa-ken (JP)

(72) Inventors: Tamotsu Fujioka, Yokohama (JP); Atsushi Unami, Yokohama (JP)

(73) Assignee: ANEST IWATA CORPORATION, Kanagawa-Ken (JP)

( * ) Notice: Subject to any disclaimer, the term of this patent is extended or adjusted under 35 U.S.C. 154(b) by 111 days.

(21) Appl. No.: 13/886,716

(22) Filed: May 3, 2013

(65) Prior Publication Data
US 2013/0315769 A1 Nov. 28, 2013

(30) Foreign Application Priority Data

May 7, 2012 (JP) .................. 2012-105909

(51) Int. Cl.
*F04C 27/00* (2006.01)
*F04C 18/00* (2006.01)
(Continued)

(52) U.S. Cl.
CPC ............ *F04C 27/00* (2013.01); *F01C 1/0215* (2013.01); *F01C 19/08* (2013.01);
(Continued)

(58) Field of Classification Search
CPC ...... F04C 27/00; F04C 18/0284; F01C 19/08; F01C 1/0215; C09K 2003/104;
(Continued)

(56) References Cited

U.S. PATENT DOCUMENTS 1,548,948 A * 8/1925 Hirshfield ..................... 277/441
4,395,205 A * 7/1983 McCullough ................. 277/652
(Continued)

FOREIGN PATENT DOCUMENTS

JP 60-252872 A 12/1985
JP 63-66671 U 5/1988
(Continued)

OTHER PUBLICATIONS

English Langauge Machine Translation of JP2006097656.*
(Continued)

*Primary Examiner* — Nicholas J Weiss
*Assistant Examiner* — Wesley Harris
(74) *Attorney, Agent, or Firm* — Hauptman Ham, LLP

(57) ABSTRACT

A seal groove is cut in the distal end face of a wrap of a fixed scroll, with a tip seal being fitted in the seal groove. Swelling members are interposed between both side faces of the tip seal and corresponding opposite side faces of the wrap. Condensed liquid of working medium w and water condensed from steam contained in the working medium w that are present between the tip seal and an end plate provide a sealing effect. When the swelling members swell upon absorbing the condensed liquids, they exert a strong pressing force on the tip seal and the wrap, thereby firmly retaining the tip seal in position. This prevents the tip seal from being pressed against the end plate, so that wear of the tip seal is reduced.

5 Claims, 5 Drawing Sheets

(51) Int. Cl.
*F01C 19/08* (2006.01)
*F01C 1/02* (2006.01)
*F16J 15/00* (2006.01)
*F16J 15/06* (2006.01)
*F04C 18/02* (2006.01)
*C09K 3/10* (2006.01)

(52) U.S. Cl.
CPC ......... *F04C 18/0284* (2013.01); *F16J 15/067* (2013.01); *F16J 15/068* (2013.01); *C09K 2003/104* (2013.01); *C09K 2003/105* (2013.01); *C09K 2003/1043* (2013.01); *C09K 2003/1046* (2013.01); *C09K 2003/1053* (2013.01); *C09K 2003/1056* (2013.01)

(58) Field of Classification Search
CPC .... C09K 2003/1043; C09K 2003/1046; C09K 2003/105; C09K 2003/1053; C09K 2003/1056; F16J 15/067; F16J 15/068
USPC ....... 418/55.2, 55.4; 277/357, 500, 589, 934
See application file for complete search history.

(56) References Cited

U.S. PATENT DOCUMENTS

| | | | | |
|---|---|---|---|---|
| 4,655,697 A | * | 4/1987 | Nakamura | F01C 1/0215 418/142 |
| 5,037,281 A | * | 8/1991 | Lane et al. | 418/55.4 |
| 5,228,827 A | * | 7/1993 | Cordts et al. | 415/168.2 |
| 5,459,202 A | * | 10/1995 | Martinez et al. | 525/200 |
| 5,632,612 A | * | 5/1997 | Shaffer | 418/55.4 |
| 5,699,673 A | * | 12/1997 | Hoshino et al. | 62/93 |
| 7,491,044 B2 | * | 2/2009 | Fujioka | F01C 19/005 277/584 |

FOREIGN PATENT DOCUMENTS

| | | |
|---|---|---|
| JP | 64-4900 U | 1/1989 |
| JP | 9158853 A | 6/1997 |
| JP | 2006046223 A | 2/2006 |
| JP | 2006097656 A | 4/2006 |
| JP | 2007162484 A | 6/2007 |

OTHER PUBLICATIONS

English Language Machine Translation of JP9158853, published on Jun. 17, 1997.*
Office Action mailed Nov. 27, 2015, corresponding to Japanese Patent Application No. 2012-105909.

* cited by examiner

SCROLL FLUID MACHINE

RELATED APPLICATIONS

The present application is based on, and claims priority from, Japanese Application Number 2012-105909, filed May 7, 2012, the disclosure of which is hereby incorporated by reference herein in its entirety.

BACKGROUND OF THE INVENTION

1. Field of the Invention

The present invention relates to a scroll fluid machine capable of reducing wear of seal members that are provided between end plates and the distal end faces of wraps while ensuring a tight seal therebetween.

2. Description of the Related Art

Scroll expanders are known, which have a pair of scrolls each formed of an end plate and a spiral wrap provided to stand on the end plate, the end plate and wrap defining and forming a plurality of expansion chambers. The scroll expanders produce rotary torque by an expansive force of working medium that is supplied at high pressure into the expansion chambers. For example, Japanese Patent Application Laid-open No. 2006-46223 discloses a scroll expander having a fixed scroll fixed to a casing and a movable scroll that rotates eccentrically to the fixed scroll.

In this scroll expander, the movable scroll is attached eccentrically to a crankshaft, so that it orbits eccentrically to the crankshaft. The movable scroll is provided with an anti-rotation mechanism to stop it from rotating around its own axis. A refrigerant introduced into expansion chambers at high pressure as a working fluid pushes the movable scroll to rotate it eccentrically with an expansive force. As a result, the volume of the expansion chambers increases, with which the refrigerant undergoes expansion. The expanded refrigerant flows out from an outlet. The rotary motion of the movable scroll is provided as rotary torque via the crankshaft. In recent small power generation systems, scroll expanders are incorporated to use the rotary torque produced by the movable scroll for the power generation.

It is necessary to provide an airtight seal for the expansion chambers in a scroll expander, and the airtight condition of expansion chambers is kept by cutting a recessed groove in the distal end face of the wrap that makes sliding contact with an opposite end plate, and mounting a tip seal in this recessed groove. Similarly, in scroll compressors that form compression chambers with a pair of scrolls to produce compressed gas, scroll blowers, or vacuum pumps that use scroll compressors, a tip seal is mounted in the distal end face of a wrap that makes sliding contact with an opposite end plate to prevent leakage of compressed gas during the compression process.

For scroll compressors, means of causing the tip seal to make tight sliding contact with the opposite end plate has been proposed, wherein notches are formed by making cuts in a bottom or side face of the tip seal, and compressed gas is guided toward the notches, to increase the tightness of the seal between the opposite end plate and the tip seal. Another means of pressing the tip seal against the opposite end plate that has been proposed is an elastic member such as rubber, elastomer or the like inserted between the bottom face of the recessed groove and the bottom face of the tip seal to apply a pressing force.

Japanese Patent Application Laid-open No. H9-158853 discloses a scroll compressor provided with a tip seal that absorbs moisture supplied thereto and swells on the distal end faces of wraps. The tip seal absorbs moisture supplied from outside and swells, thereby being entirely pressed against the opposite end plate in uniform pressing force, so that the compression chambers are kept sealed.

Japanese Patent Application Laid-open No. 2006-97656 discloses a scroll compressor, wherein an elastic filling member is provided between side and bottom faces of a recessed groove and side and bottom faces of a tip seal to fill the gap between the recessed groove and tip seal, when mounting the tip seal in the recessed groove formed in the distal end face of the wrap. The compressed fluid is thereby prevented from leakage through the recessed groove.

Generally, air compressors employ an oil lubrication system, in which lubricating oil is supplied to the compression chambers for the purposes of preventing a temperature rise of compressed air or the like, sealing the compression chambers, and lubricating the sliding parts. Such oil-lubricated air compressors cannot be used in factories which require clean compressed air, for example, food factories, pharmaceutical factories, or precision equipment factories, because the oil component mixed in the compressed air cannot completely be removed. Therefore, water-lubricated air compressors have been proposed, which use water instead of lubricating oil. As such a water-lubricated air compressor generates oil-free compressed air, the compressor can be used even in a factory which requires clean compressed air. Japanese Patent Application Laid-open No. 2007-162484 discloses one such water-lubricated air compressor. The structure of the common water-lubricated air disclosed in Japanese Patent Application Laid-open No. 2007-162484 will be described below with reference to FIG. 7.

In FIG. 7, the water-lubricated air compressor 100 includes an basic air compressor 102 that compresses air, a separator tank 104 that separates water from the compressed air, a dryer 106 for removing moisture contained in the compressed air, and a water cooler 108 that cools the water. The basic air compressor 102 is configured by a compressor such as a scroll compressor, screw compressor, reciprocating compressor, or turbo compressor. Water supplied to the basic air compressor 102 from piping 110 is used for lubrication between scrolls and cooling of the scrolls in the case with a scroll compressor. Air to be compressed is supplied to the basic air compressor 102, where it is compressed, by opening a valve 114 in piping 112.

The compressed air travels through piping 116 with water to the separator tank 104, where it is separated from the water. As this air separated from water contains much moisture, it is dried by the dryer 106, and exits from a discharge pipe 118 to a user side. Water 120 separated in the separator tank 104 is supplied through piping 122 to the water cooler 108, where it is cooled. The water cooled in the water cooler 108 is supplied to the basic air compressor 102 through the piping 110.

When the water circulating in the water-lubricated air compressor 100 needs to be cleaned, a water discharge valve 124 is opened to discharge water in the separator tank 104 from piping 126 as required, while a water supply valve 128 or 130 is opened to supply fresh water from the piping 132 or 134. The water level inside the separator tank 104 is checked by means of a water gauge 136 provided in the separator tank 104.

In scroll expanders, as steam or refrigerant used as the working medium undergoes adiabatic expansion in the expansion chambers, the working medium or the steam contained therein condenses, whereby condensed liquid of working medium or condensed water is generated. Such condensed liquid or condensed water present between the opposite end plate and the tip seal provides a sealing effect for preventing leakage of the working medium from the expansion chambers. However, with such condensed liquid being present between the tip seal and the opposite end plate, if a pressing force is applied to press the tip seal against the opposite end plate and if the tip seal is kept in pressure contact with the opposite end plate, wear of the tip seal will progress because of the effect of the liquid.

In water-lubricated scroll compressors, too, the water used as the lubricating liquid present between the opposite end plate and the tip seal provides the sealing effect for preventing leakage of compressed gas from the compression chambers. However, as with scroll expanders, if a pressing force is applied to press the tip seal against the opposite end plate and if the tip seal is kept in pressure contact with the opposite end plate, wear of the tip seal will progress because of the effect of the water.

Therefore, the means of pressing the tip seal against the opposite end plate disclosed in Japanese Patent Application Laid-open No. H9-158853 cannot be employed in scroll expanders or water-lubricated scroll compressors for increasing the sealing effect. The means disclosed in Japanese Patent Application Laid-open No. 2006-97656 cannot resolve the problem of progressive wear of the tip seal noted above. On the other hand, the function of keeping the seal between the tip seal and the opposite end plate is required, in consideration of the loss of the sealing function of the tip seal due to the tolerance caused by processing errors, or thermal deformation during the operation, of components forming the expansion or compression chambers.

SUMMARY OF THE INVENTION

In view of these problems, the object of the present invention is to reduce wear of a tip seal in a scroll fluid machine that may progress due to the presence of a liquid, while maintaining a seal by the use of the sealing effect provided by the liquid present between the tip seal and an opposite end plate.

To achieve the above object, a scroll fluid machine according to the present invention includes: a pair of scrolls, each having an end plate and a spiral wrap provided to stand on the end plate and disposed such that a distal end face of the wrap faces the opposite end plate to form a sealed chamber between the scrolls; a seal member inserted in a seal groove formed in the distal end face of the wrap to provide a seal between the distal end face and the opposite end plate; and a swelling member interposed between the seal member and a side face of the seal groove facing the seal member, the swelling member swelling upon absorbing a liquid in the sealed chamber to press the seal member toward an opposite side face of the seal groove. The liquid in the sealed chamber here may be, for example, in the case with a scroll expander, condensed liquid of working medium, or water condensed from steam contained in the working medium. In the case with a water-lubricated compressor, it is water used as the lubricating liquid.

There is almost no gap between the seal member and the opposite end plate, but the liquid present in the sealed chamber resides in between the seal member and the opposite end plate and thereby maintains a seal therebetween. The swelling member generates a strong pressing force on the side face of the seal member and the opposing face of the seal groove upon absorbing the liquid and swelling. The seal member is thereby firmly retained in position inside the seal groove relative to the opposite end plate, so that the seal member will not be kept in pressure contact with the opposite end plate. Thus progressive wear of the seal member is prevented. In this way, the seal member is prevented from being excessively pressed against the opposite end plate while the seal is maintained between the opposite end plate and the seal member, to reduce wear of the seal member.

The swelling member may be made of a rubber compound containing an absorbent polymer, for example, or resins having swelling properties such as sodium polyacrylate or polyamide resin. In the present invention, the swelling member is interposed only between the side face of the seal member and the opposing face of the wrap, and not between the bottom face of the seal member and the bottom face of the seal groove. Therefore, the seal member is prevented from being pressed against the opposite end plate. The swelling member may be fixedly attached to the side face of the seal member or the opposing face of the wrap, or just be inserted therebetween.

In the present invention, a pressing member may further be provided, which may be interposed between a bottom face of the seal member and a bottom face of the seal groove to apply pressing force to the seal member toward the opposite end plate. With such a pressing member, in a scroll expander, at a stage where the working medium has not condensed into liquid yet through adiabatic expansion, the swelling member does not swell, so that the seal member is pressed against the opposite end plate by the pressing force exerted by the pressing member. This provides a sealing effect between the tip seal and the opposite end plate.

After liquid such as condensed liquid has been generated, this liquid such as condensed liquid provides a sealing effect by being present between the seal member and the opposite end plate. Also, as the swelling member swells upon absorbing the liquid, the swollen swelling member retains the tip seal in its axial position relative to the opposite end plate. After the tip seal is retained, the seal member will be prevented from being pressed against the opposite end plate excessively, so that wear of the seal member is reduced. An elastic material such as rubber, elastomer, and the like, for example, may be used for the pressing member. Thus, with the use of the pressing force applied by the pressing member, the sealing effect in the scroll expander can be enhanced.

In the present invention, a recessed groove may be formed in one side face of the seal member to open toward a side face of the seal groove, and the swelling member may be formed in a rod-like shape and inserted in the recessed groove. In this configuration, the rod-like swelling member is interposed between a side face of the recessed groove and the side face of the seal groove. The swelling member can thus be mounted easily. The rod-like swelling member should preferably be made of a material such as, for example, styrene-butadiene rubber, butyl rubber, and the like. Such swelling member can be mounted even more easily by adopting such elastic materials.

In the present invention, a piece of nonwoven fabric made of a material having characteristics of swelling upon absorbing the liquid in the sealed chamber may be used. Nonwoven fabric applied or impregnated with a resin having absorbing and swelling properties, for example, such as starch-acrylate-grafted copolymer, cross linking polyacrylate-polyvinyl alcohol copolymer, starch-acrylonitrile grafted copolymer has such swelling properties and can be applied. The use of such inexpensive nonwoven fabric as the swelling member will enable a reduction in cost.

In the present invention, the swelling member may be an adhesive having characteristics of swelling upon absorbing the liquid in the sealed chamber, and the seal member may be bonded to the opposing face of the wrap by means of this adhesive. Examples of adhesives applicable in the present invention include adhesives composed of an absorbent polymer, a filler, a solvent, and the like, and aqueous vinyl urethane adhesives, and the like. With the use of such an adhesive having swelling properties, the tip seal can be firmly retained to the side face of the seal groove.

With the present invention applied to a scroll expander, a sealing effect is achieved for the expansion chamber, with the use of condensed liquid of working medium or water condensed from steam contained in the working medium, as well as wear of the seal member can be reduced by the provision of the swelling member. Additionally, with the present invention applied to a water-lubricated scroll compressor, a sealing effect is achieved for the compression chamber, by use of the water used as the lubricating liquid, as well as wear of the seal member can be reduced by the provision of the swelling member.

According to the scroll fluid machine of the present invention, a swelling member that swells upon absorbing a liquid in the sealed chamber interposed between a side face of a seal member and an opposing face of a seal groove, and the liquid present between the seal member and an opposite end plate maintain the seal function of the sealed chamber. As the swelling member swells upon absorbing the liquid, it retains the seal member firmly in position relative to the opposite end plate, so that the seal member is not pressed against the opposite end plate excessively, whereby wear of the seal member can be reduced.

DESCRIPTION OF THE PREFERRED EMBODIMENTS

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

Embodiment 1

Figure 1:
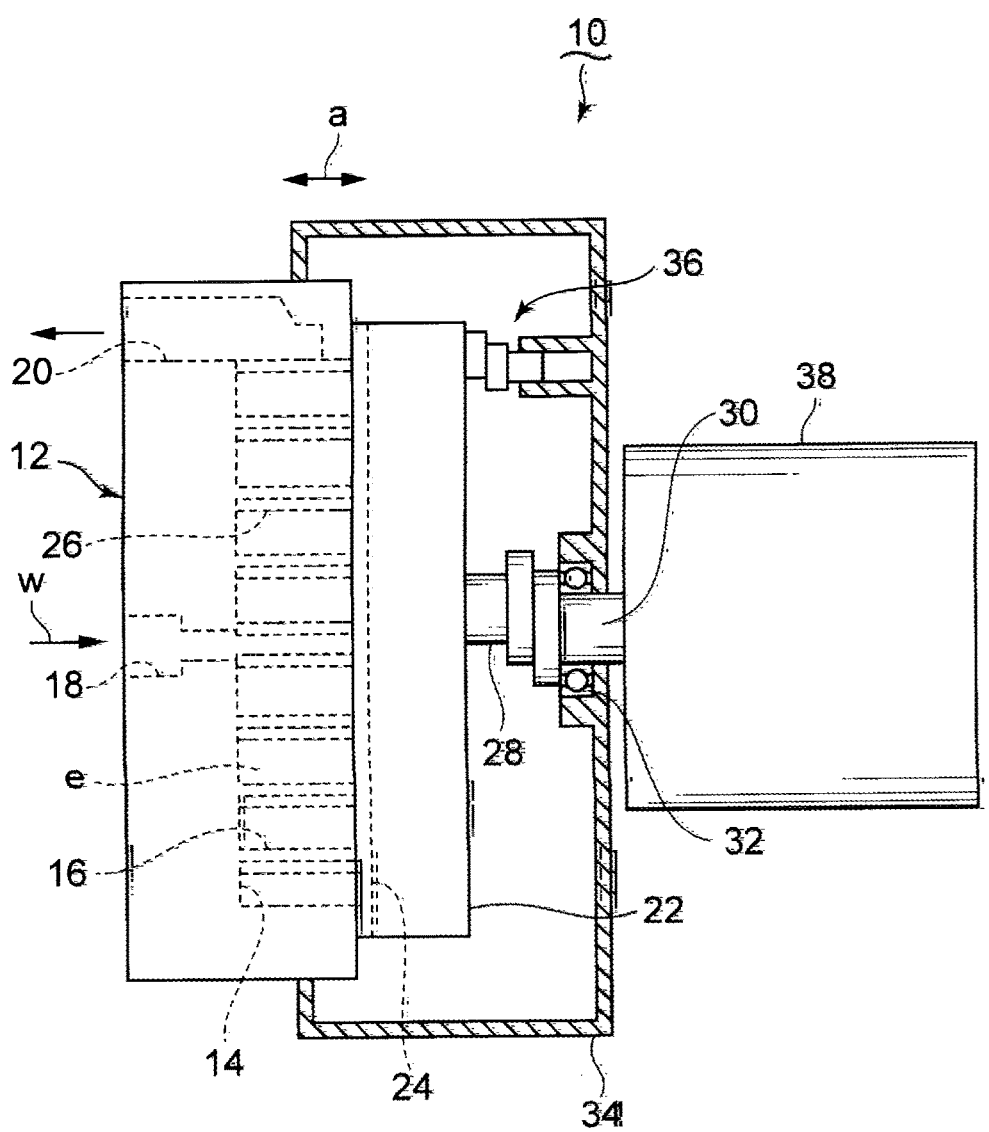
FIG. 1 is an overall diagram of a scroll expander according to a first embodiment of the apparatus of the present invention.

A first embodiment in which the present invention is applied to a scroll expander will be described with reference to FIG. 1 to FIG. 3. In FIG. 1, the scroll expander 10 has a fixed scroll 12 and an orbiting scroll 22 arranged facing each other. The fixed scroll 12 includes an end plate 14 and a spiral wrap 16 provided to stand on the end plate 14 along the axial direction a of the scroll expander 10. The orbiting scroll 22 includes an end plate 24 and a spiral wrap 26 provided to stand on the end plate 24 along the axial direction a. The wrap 16 and the wrap 26 make line contact with each other so that a plurality of expansion chambers e are formed by the end plates 14 and 24 and wraps 16 and 26. The plurality of expansion chambers e are formed on both sides of the wraps 16 and 26 toward outer peripheral side of the wraps.

The orbiting scroll 22 has a center shaft 28 attached eccentrically to a crankshaft 30, so that it orbits eccentrically to the crankshaft 30. The orbiting scroll 22 is provided with an anti-rotation mechanism 36 to stop itself from rotating around its own axis. A housing 34 surrounds the orbiting scroll 22, and the crankshaft 30 is rotatably supported by the housing 34 via a roller bearing 32. The crankshaft 30 is connected to an electrical generator 38.

Working medium w such as refrigerant is supplied at high pressure from an inlet hole 18 formed in a central part of the fixed scroll 12. The working medium w flowing into the expansion chambers e pushes the orbiting scroll 22 to orbit by its expansive force. As a result, the volume of the expansion chambers e increases, with which the working fluid w undergoes adiabatic expansion. The adiabatically expanded working medium w flows out from an outlet hole 20 formed in an outer peripheral part of the fixed scroll 12. The orbiting motion of the orbiting scroll 22 provides rotary torque via the crankshaft 30 for rotating the electrical generator 38 to generate power.

Figure 2:
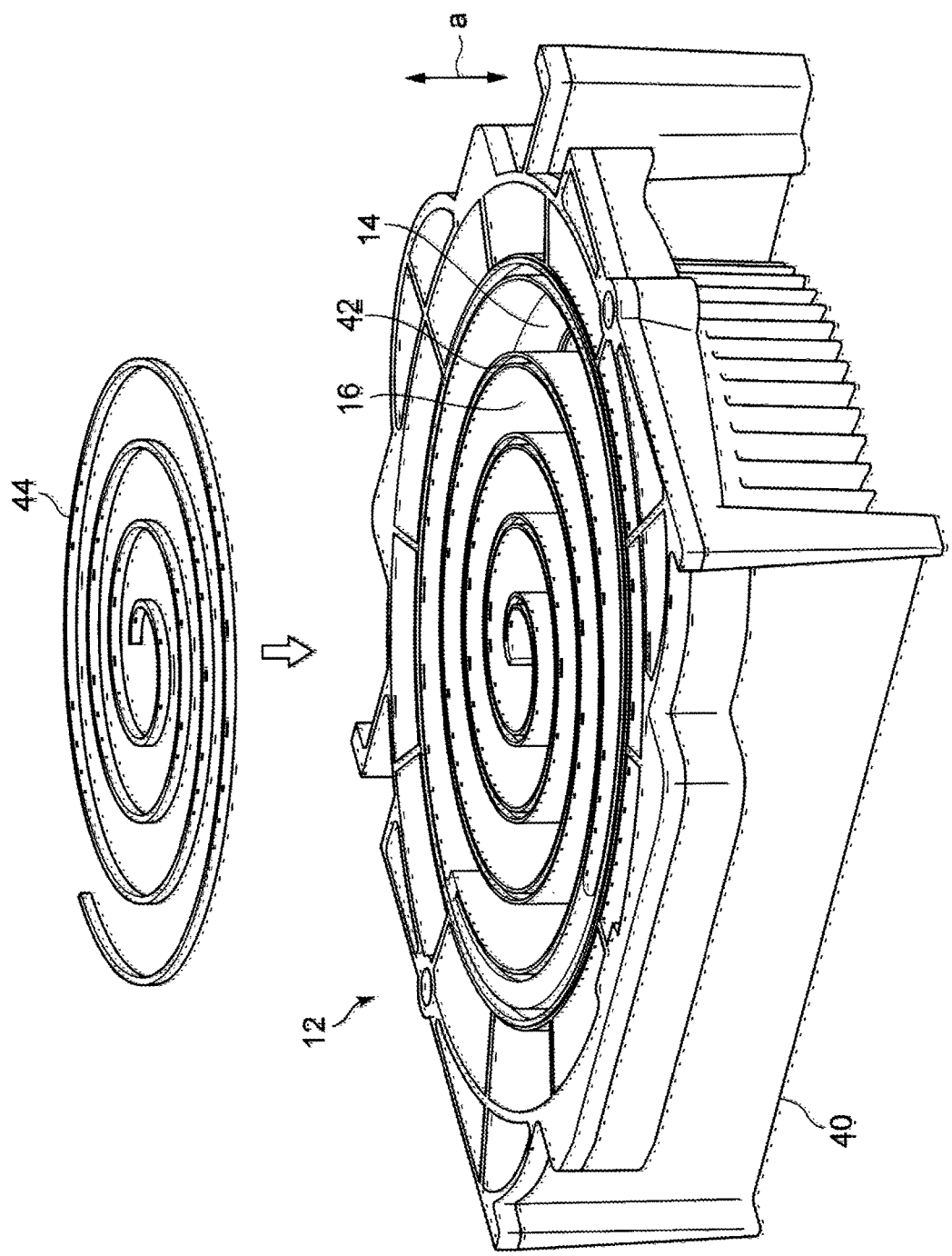
FIG. 2 is a perspective view of a fixed scroll of the scroll expander according to the first embodiment.
Figure 3:
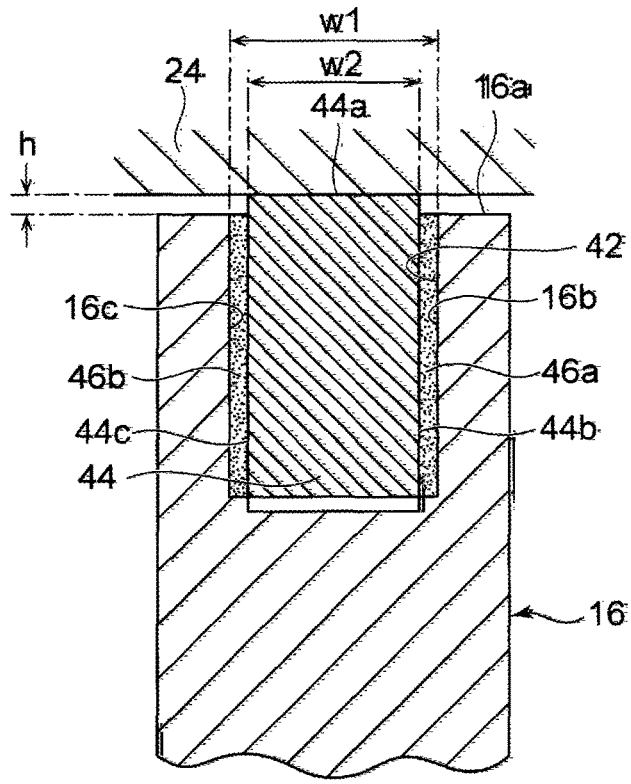
FIG. 3 is a cross-sectional view of a sealed portion of an expansion chamber according to the first embodiment.

FIG. 2 illustrates the fixed scroll 12. In FIG. 2, a casing 40 that is part of the fixed scroll 12 is formed in a short-cylindrical shape. Inside the casing 40 is secured the disc-shaped end plate 14 in a direction perpendicular to the axial direction a of the scroll expander. The wrap 16 curved in a spiral shape is provided to stand on the end plate 14 along the axial direction a. A seal groove 42 having a substantially quadrate cross section is cut in the distal end face of the wrap 16 over the entire range in the lengthwise direction of the wrap 16.

A spirally shaped tip seal 44 is fitted in over the entire length of the seal groove 42. The tip seal 44 has a quadrate cross section. As shown in FIG. 3, the tip seal has a widthwise dimension w2 that is smaller than a widthwise dimension w1 of the seal groove 42, and the same lengthwise dimension as that of the wrap 16. The difference between the widthwise dimension w1 of the seal groove 42 and the widthwise dimension w2 of the tip seal 44 is set just so that swelling members 46a and 46b to be described later can be interposed between the recessed groove 42 and the tip seal 44.

The tip seal 44 has a smooth upper face 44a protruded from the distal end face 16a of the wrap 16 by a small height h. During production of the scroll expander, a spacer adjusted to have a predetermined height dimension is placed on the end plate 14, and a jig plate is placed on top of this spacer to provide a desired space between the end plate 24 and the distal end face 16a of the wrap 16. At this time, the upper face 44a of the tip seal 44 is adjusted to a position in contact with the jig plate, so that there will be almost no gap between the upper face 44a of the tip seal 44 and the end plate 14 when the scroll expander 10 is assembled.

A plate-like swelling member 46a is interposed between a right side face 16b of the seal groove 42 of the wrap 16 and a right side face 44b of the tip seal 44. Also, a plate-like swelling member 46b is interposed between a left side face 16c of the seal groove 42 of the wrap 16 and a left side face 44c of the tip seal 44. The swelling members 46a and 46b are each disposed over the entire length of the wrap 16 and the tip seal 44, and have substantially the same height dimension as that of the seal groove 42. Therefore, the distal end face 16a of the wrap 16 and upper end faces of the swelling members 46a and 46b are substantially at the same height. The swelling members 46a and 46b may be bonded to the wall surface of the wrap 16 or the tip seal 44, or not bonded and simply inserted therebetween.

The orbiting scroll 22 is assembled to the fixed scroll 12 with the tip seal 44 fitted in the wrap 16. On the distal end face of the wrap 26, the orbiting scroll 22 has a seal groove identical to the seal groove 42, and a tip seal (not shown) having the same configuration as the tip seal 44 in the seal groove is mounted to the identical seal groove.

The tip seals provided in the wrap distal end faces of the fixed scroll 12 and the orbiting scroll 22 make sliding contact with each other's end plate, so that the wraps of the fixed scroll 12 and the orbiting scroll 22 make line contact with each other along the axial direction a, thereby forming a plurality of expansion chambers e. The plurality of expansion chambers e are formed along the wraps 16 and 26 from the center of the casing 40 toward outer peripheral side of the wraps.

The swelling members 46a and 46b are made of a rubber compound containing an absorbent polymer, for example, or resins having swelling properties such as sodium polyacrylate or polyamide resin. The working medium w such as refrigerant liquefies as it is cooled through adiabatic expansion, and steam contained in the working medium w condenses into water. The swelling members 46a and 46b absorb these condensed liquids and swell. As the swelling members 46a and 46b swell, they apply a strong pressing force on the tip seal 44 and the wrap 16, thereby firmly retaining the tip seal 44 in position inside the seal groove 42 in the axial direction a.

According to this embodiment, the condensed liquid of working medium w and water condensed from steam contained in the working medium w that are present between the upper face 44a of the tip seal 44 and the end plate 24, thereby keep the seal. While the upper face 44a of the tip seal 44 may suffer slight wear at the start of operation before any condensed liquid is generated, once the swelling members 46a and 46b swell and secure the tip seal 44 at its axial position, the tip seal 44 is not pressed against the end plate 24. Therefore wear on the upper face 44a of the tip seal 44 is reduced after the generation of condensed liquid.

Embodiment 2

Figure 4:
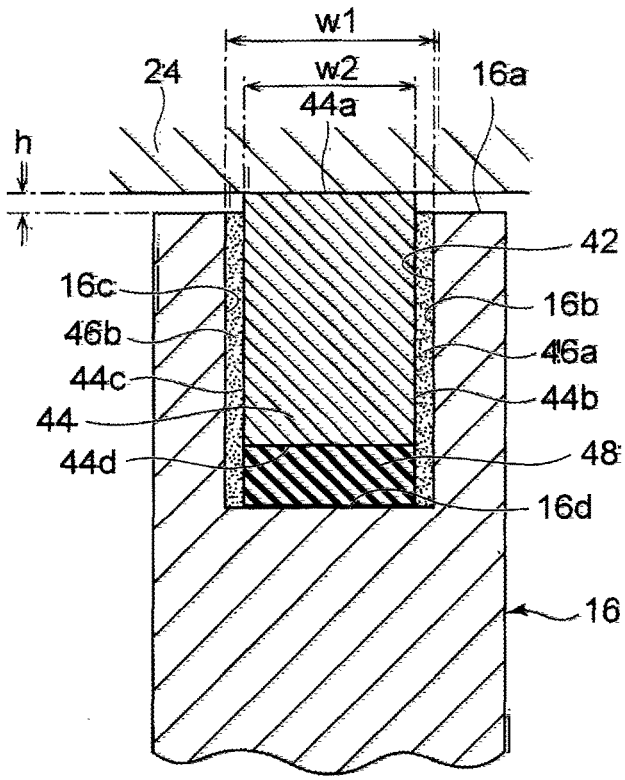
FIG. 4 is a cross-sectional view of a sealed portion of an expansion chamber of a scroll expander according to a second embodiment of the apparatus of the present invention.

Next, a second embodiment of the apparatus of the present invention will be described with reference to FIG. 4. In this embodiment, a space having a quadrate cross section is provided between the bottom face 44d of the tip seal 44 and the groove bottom face 16d of the wrap 16, which space is filled with an elastic member 48 having a quadrate cross section and made of rubber, elastomer or the like. The structure is otherwise the same as that of the first embodiment.

In this embodiment, before the swelling of the swelling members 46a and 46b through absorption of liquefied working medium or the like, the elastic member 48 applies pressing force to press the upper face 44a of the tip seal 44 against the end plate 24. After the swelling members 46a and 46b have swollen by the liquefied working medium or the like, they retain the tip seal 44 at its axial position.

Thus, before the swelling of the swelling members 46a and 46b, the tip seal 44 is pressed against the end plate 24 by the pressing force applied by the elastic member 48, whereby a good sealing effect is achieved. After the swelling members 46a and 46b have swollen by the liquefied working medium or the like, the tip seal 44 is retained in its axial position, so that the upper face 44a of the tip seal 44 is no longer pressed against the end plate 24, and thus wear of the upper face 44a of the tip seal is reduced, while a good sealing effect is maintained by the presence of condensed liquid between the upper face 44a of the tip seal 44 and the end plate 24.

Embodiment 3

Figure 5:
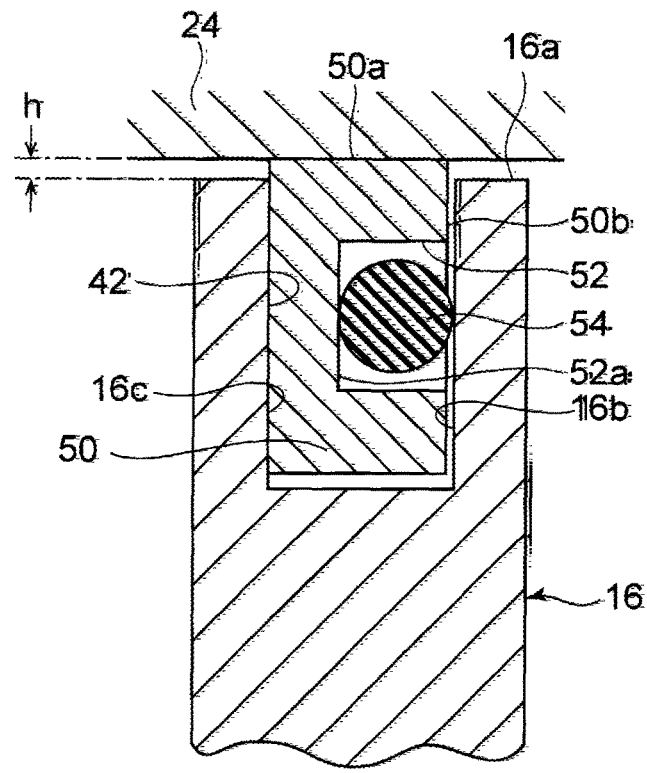
FIG. 5 is a cross-sectional view of a sealed portion of an expansion chamber of a scroll expander according to a third embodiment of the apparatus of the present invention.

Next, a third embodiment of the apparatus of the present invention will be described with reference to FIG. 5. In this embodiment, a recessed groove 52 having a quadrate cross section is cut in the right side face 50b of the tip seal 50 instead of the swelling members 46a and 46b provided in the first embodiment. A rod-like swelling member 54 having a circular cross section is inserted in the recessed groove 52. This swelling member 54 has a rod-like shape and it extends over the entire length of the wrap 16. In this configuration, the swelling member 54 is interposed between a side face 52a of the recessed groove 52 and a right side face 16b of the groove of the wrap 16 facing the side face 52a. The swelling member 54 is made of styrene-butadiene rubber or butyl rubber, which have characteristics of swelling upon absorbing condensed liquid of working medium w or water condensed from steam contained in the working medium w. The structure is otherwise the same as that of the previously described first embodiment.

According to this embodiment, as condensed liquid of working medium w and water condensed from steam contained in the working medium w are generated, a sealing effect is provided between the upper face 50a of the tip seal 50 and the end plate 24 by these liquids present therebetween. As the swelling member 54 swells upon absorbing the condensed liquid(s), it retains the tip seal 50 at its axial position, thereby releasing the tip seal 50 from the pressing force against the end plate 24, whereby wear of its upper face 50a can be reduced. Additionally, simplification of structures and reduction in cost are enabled by use of the rod-like swelling member 54. Also, the swelling member 54 can be easily mounted.

Embodiment 4

Figure 6:
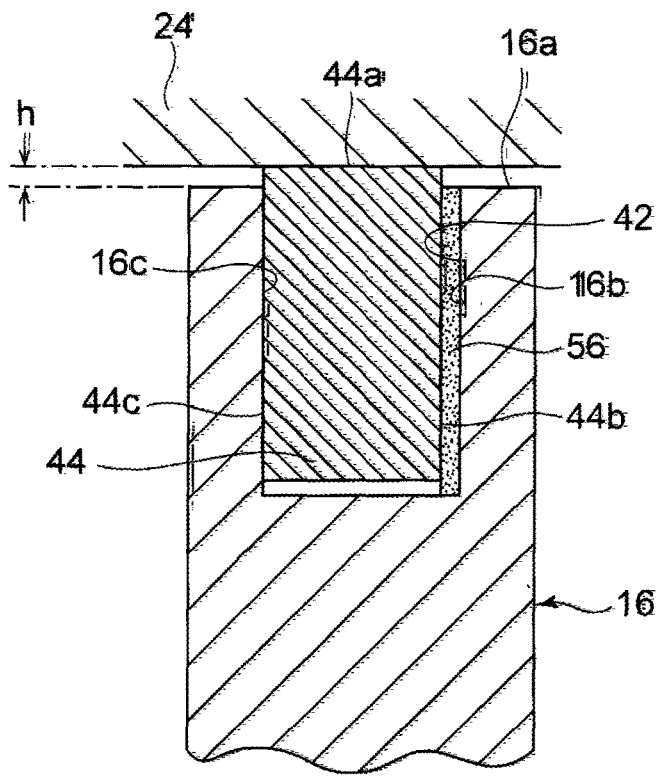
FIG. 6 is a cross-sectional view of a sealed portion of an expansion chamber of a scroll expander according to a fourth embodiment of the apparatus of the present invention.
Figure 7:
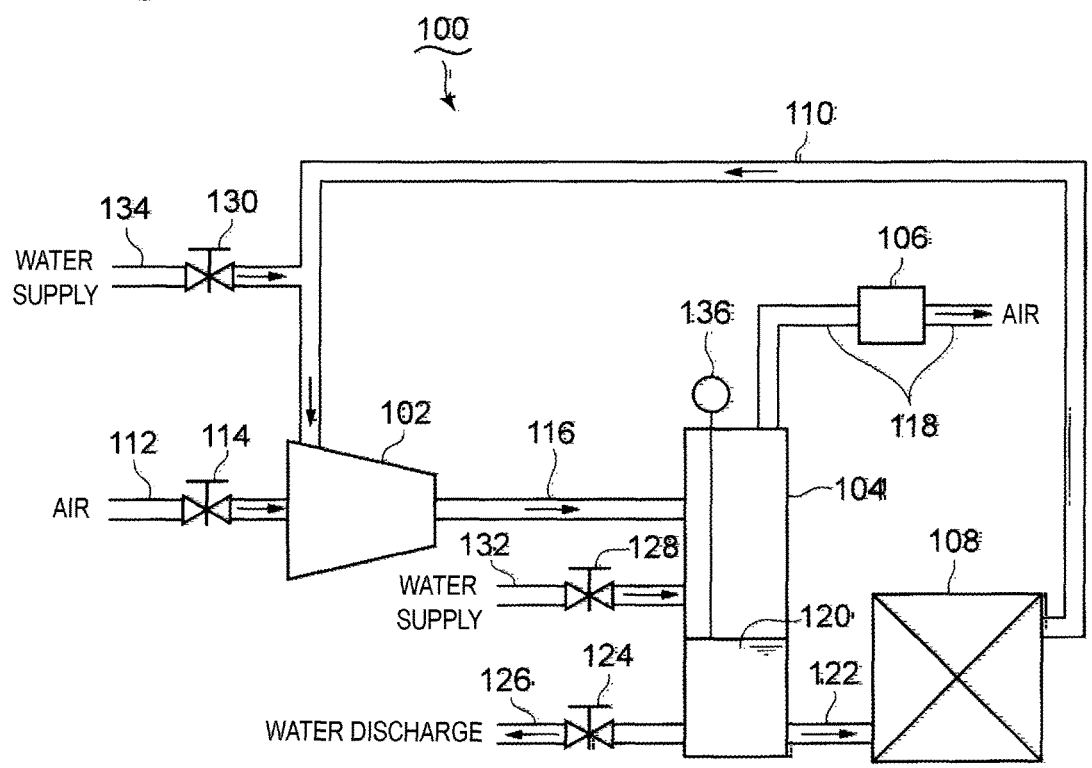
FIG. 7 is a system diagram of a conventional water-lubricated air compressor.

Next, a fourth embodiment of the apparatus of the present invention will be described with reference to FIG. 6. In this embodiment, a piece of nonwoven fabric 56 made of nonwoven fabric applied or impregnated with a resin having absorbing and swelling properties selected from the aforementioned starch-acrylate-grafted copolymer, cross linking polyacrylate-polyvinyl alcohol copolymer, starch-acrylonitrile grafted copolymer, and the like, is interposed between the right side face 44b of the tip seal 44 and the right side face 16b of the seal groove 42 of the wrap 16 instead of the swelling members 46a and 46b provided in the first embodiment. The nonwoven fabric 56 can swell upon absorbing condensed liquid of the working medium or the like. The nonwoven fabric 56 is only inserted between the right side face 44b of the tip seal 44 and the right side face 16b of the groove of the wrap 16, and not bonded to either of the side faces. The structure is otherwise the same as that of the previously described first embodiment.

With this embodiment, the condensed liquid present between the upper face 44a of the tip seal 44 and the end plate 24 provides a seal therebetween, and, as the tip seal 44 is firmly retained at its axial position when the nonwoven fabric 56 swells upon absorbing the condensed liquid of working medium or the like, wear of the upper face 44a can be reduced. The use of the inexpensive nonwoven fabric 56 enables a reduction in cost, and the nonwoven fabric 56 can be easily mounted as it is simply inserted between the right side face 44b of the tip seal 44 and the right side face 16b of the groove of the wrap 16.

An adhesive having the characteristics of swelling upon absorbing condensed liquid of the working medium or the like may be used instead of the swelling members employed in the first to third embodiments. Examples of adhesives having such characteristics include adhesives composed of absorbent polymer, a filler, a solvent, and the like, and aqueous vinyl urethane adhesives, and the like. For example, instead of the swelling members 46a and 46b in the first embodiment shown in FIG. 2, an adhesive having such swelling properties may be applied between the right side face 44b of the tip seal 44 and the right side face 16b of the groove of the wrap 16, and between the left side face 44c of the tip seal 44 and the left side face 16c of the groove of the wrap 16. This can provide a sealing effect between the tip seal 44 and the end plate 24, as well as reduce wear of the tip seal 44. The use of an adhesive will also reinforce the bond between the tip seal 44 and the wrap 16.

While the respective embodiments described above present a configuration in which a recessed groove is each provided to the wrap of the fixed scroll fixed to the casing and to the wrap of the orbiting scroll with a tip seal each being fitted in the respective recessed grooves, the tip seal and the swelling member may be provided to only one of the wraps. Although the respective embodiments described above present examples in which a fixed scroll and an orbiting scroll are used, the present invention can be applied to scroll expanders having two opposite, both rotating, scrolls.

Although the previously described embodiments are all examples of applying the present invention to a scroll expander, the present invention can also be applied to water-lubricated scroll compressors, with the same advantageous effects as with the scroll expanders. Namely, water used as the lubricating liquid present in the sealing surface of the compression chambers can increase the sealing effect for the compression chambers. Moreover, as the swelling member interposed between a side face of the tip seal and an opposite face of the seal groove retains the position of the tip seal relative to the opposite end plate, progressive wear of the tip seal can be prevented.

According to the present invention, a good sealing effect is maintained for the sealing surface of the tip seal by the presence of a liquid between the tip seal and the opposite end plate, and also wear of the tip seal, which may progress, is effectively reduced due to the presence of the liquid.

What is claimed is:

1. A scroll fluid machine, comprising:
a pair of scrolls, each having an end plate and a spiral wrap provided to stand on the end plate and disposed such that a distal end face of the spiral wrap faces the opposite end plate to form a sealed chamber between the scrolls;
a tip seal inserted in a seal groove formed in the distal end face of the spiral wrap to provide a seal between the distal end face and the opposite end plate;
a first swelling member interposed between a first side face of the tip seal and a first side face of the seal groove facing the tip seal; and
a second swelling member interposed between a second side face of the tip seal and a second side face of the seal groove facing the tip seal,
wherein
the first swelling member is not bonded to both of the tip seal and the first side face of the seal groove,
the second swelling member is not bonded to both of the tip seal and the second side face of the seal groove,
each of the swelling members is swelling upon absorbing a liquid in the sealed chamber to press the tip seal toward the other swelling member, and
in a cross section view of the spiral wrap, the first swelling member is not connected to the second swelling member.

2. The scroll fluid machine according to claim 1, further comprising:
a pressing member interposed between a bottom face of the tip seal and a bottom face of the seal groove and applying pressing force to the tip seal toward the opposite end plate.

3. The scroll fluid machine according to claim 1, wherein the scroll fluid machine is a scroll expander that forms an expansion chamber with the pair of scrolls.

4. The scroll fluid machine according to claim 1, wherein the scroll fluid machine is a water-lubricated scroll compressor that forms a compression chamber with the pair of scrolls and uses water as a lubricating liquid.

5. The scroll fluid machine according to claim 1, further comprising:
an elastic member having a quadrate cross section,
wherein the elastic member fills a space between a bottom face of the tip seal and a bottom face of the seal groove, the space having a quadrate cross section.

* * * * *